(12) United States Patent
Foutch et al.

(10) Patent No.: US 11,591,967 B2
(45) Date of Patent: Feb. 28, 2023

(54) SYSTEMS AND METHODS FOR PROVIDING MECHANICAL POWER TO AN AIRCRAFT ACCESSORY WITH A TURBINE ENGINE

(71) Applicant: The Boeing Company, Chicago, IL (US)

(72) Inventors: David W. Foutch, Chicago, IL (US); Joseph M. Dirusso, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/400,237

(22) Filed: Aug. 12, 2021

(65) Prior Publication Data

US 2022/0195884 A1    Jun. 23, 2022

Related U.S. Application Data

(60) Provisional application No. 63/128,242, filed on Dec. 21, 2020.

(51) Int. Cl.
*F02C 7/32*    (2006.01)

(52) U.S. Cl.
CPC .......... *F02C 7/32* (2013.01); *F05D 2220/323* (2013.01); *F05D 2260/4023* (2013.01)

(58) Field of Classification Search
CPC . F01D 15/10; F01D 15/12; F02C 7/32; F05D 2260/4023; F05D 2220/323
See application file for complete search history.

(56) References Cited

U.S. PATENT DOCUMENTS

| | | | |
|---|---|---|---|
| 4,776,163 A * | 10/1988 | Brockmann | ............ F02C 7/36 60/792 |
| 8,039,983 B2 | 10/2011 | Cote et al. | |
| 8,304,927 B2 | 11/2012 | Cote et al. | |
| 10,100,744 B2 | 10/2018 | Mackin et al. | |
| 10,336,461 B2 | 7/2019 | Mackin | |
| 10,377,498 B2 | 8/2019 | Mackin | |
| 2008/0047376 A1 * | 2/2008 | Venter | ...................... F02C 7/36 74/15.2 |
| 2016/0167789 A1 | 6/2016 | Knight et al. | |

(Continued)

FOREIGN PATENT DOCUMENTS

EP    3208195 A1    8/2017

OTHER PUBLICATIONS

Hossein Balaghi Enalou et al., "A Preliminary Study into Turbofan Performance with LP-HP Power Exchange", Proceedings of Montreal 2018 Global Power and Propulsion Forum, May 7-9, 2018.

*Primary Examiner* — Woody A Lee, Jr.
*Assistant Examiner* — Elton K Wong
(74) *Attorney, Agent, or Firm* — McDonnell Boehnen Hulbert & Berghoff LLP

(57) ABSTRACT

An example system for providing mechanical power to an aircraft accessory with a turbine engine, where the turbine engine includes a low-speed spool and a high-speed spool, includes an accessory gearbox disposed between the low-speed spool and the high-speed spool and a clutch disposed within or external to the accessory gearbox. The accessory gearbox is configured to drive the aircraft accessory, and the clutch is configured to enable either the high-speed spool or the low-speed spool to provide mechanical power to the aircraft accessory via the accessory gearbox.

20 Claims, 9 Drawing Sheets

(56) References Cited

U.S. PATENT DOCUMENTS

| | | | |
|---|---|---|---|
| 2017/0233080 A1* | 8/2017 | Knight | F02C 7/26 |
| | | | 417/53 |
| 2018/0202310 A1* | 7/2018 | Suciu | F02C 7/268 |
| 2018/0223740 A1* | 8/2018 | Forest | F02C 7/268 |
| 2019/0383220 A1 | 12/2019 | Makin | |
| 2020/0355122 A1 | 11/2020 | Foutch et al. | |
| 2021/0102499 A1* | 4/2021 | Leque | F16H 3/46 |

* cited by examiner

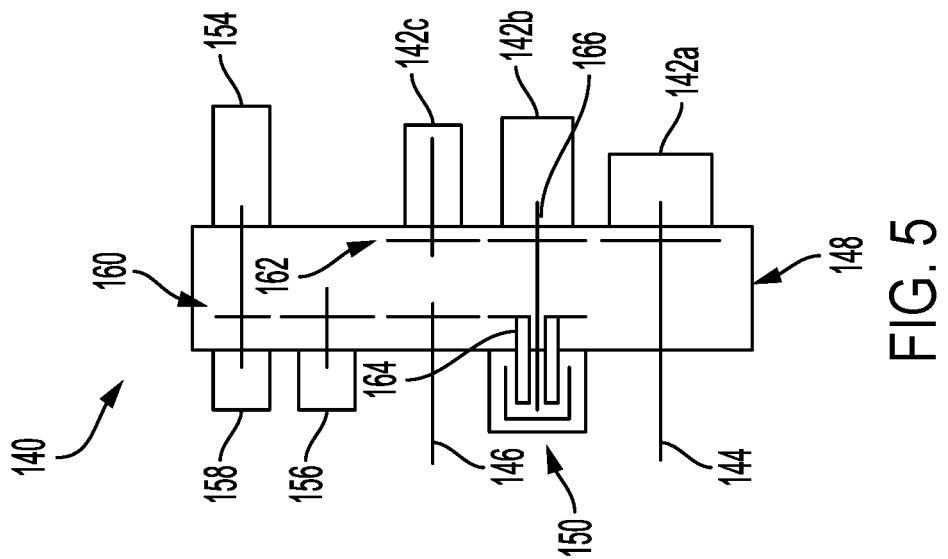
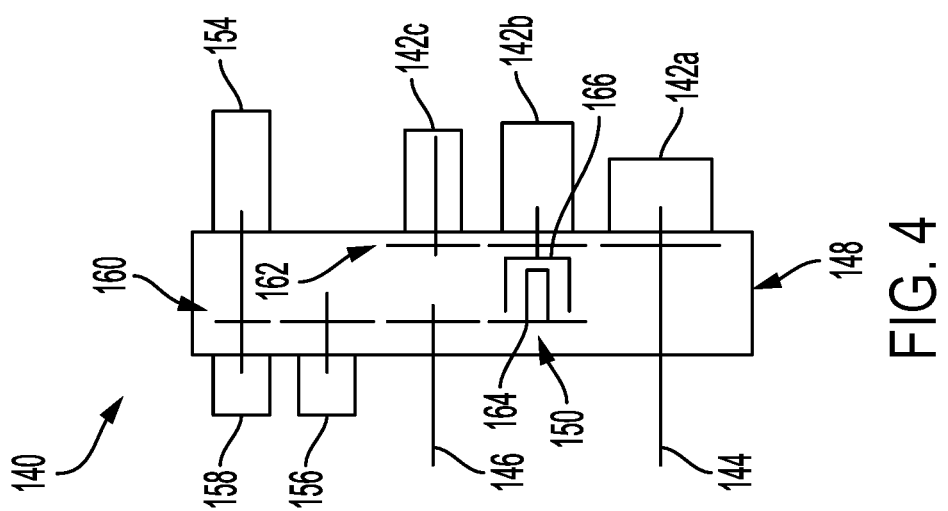

SYSTEMS AND METHODS FOR PROVIDING MECHANICAL POWER TO AN AIRCRAFT ACCESSORY WITH A TURBINE ENGINE

CROSS REFERENCE TO RELATED APPLICATION

The present disclosure claims priority to U.S. provisional patent application No. 63/128,242, filed on Dec. 21, 2020, the entire disclosure of which is herein incorporated by reference.

FIELD

The present disclosure relates generally to systems and methods for providing mechanical power to accessories mounted to a turbine engine and, more particularly, to methods and systems for providing the mechanical power from either of two spools in the turbine engine.

BACKGROUND

Modern commercial aircraft are typically driven by two or more turbofan engines. These engines include a fan that provides a significant fraction of the overall propulsion system thrust. An engine core drives the fan and produces additional thrust by directing exhaust products in an aft direction.

In addition to providing thrust to propel the aircraft, the turbofan engines power the aircraft electric, hydraulic and pneumatic systems, via accessories mounted to an accessory gearbox (AGB).

Typically, gas turbine engines include a high-speed (also referred to as a high-pressure) spool offtake system that includes an offtake shaft driven by the high-speed spool of the engine. The offtake shaft in turn drives a gear train inside the AGB. A number of accessories are mounted to the AGB. Some of the accessories are needed for engine operation, such as an oil pump and a fuel pump. Other accessories supply power to aircraft systems, such as an electrical generator and a hydraulic pump.

As engine technology has improved and aircraft systems have evolved, a level of power demanded by the systems, compared to power available in the engine core during low engine thrust conditions such as idle, may result in a less-efficient high-pressure compressor, higher idle thrust, and higher idle fuel flow. Further, during an engine-out condition, no power is provided to the aircraft accessories because the engine core has a very low speed during windmill conditions.

SUMMARY

In an example, a system for driving the components installed on an accessory gearbox using either a low-speed spool (e.g., low-pressure spool) or a high-speed spool (e.g., high-pressure spool) is described.

In one example, a system for providing mechanical power to an aircraft accessory with a turbine engine is described. The turbine engine includes a low-speed spool and a high-speed spool. The system comprises an accessory gearbox disposed between the low-speed spool and the high-speed spool, and the accessory gearbox configured to drive the aircraft accessory. The system also comprises a clutch disposed within the accessory gearbox, the clutch configured to enable either the high-speed spool or the low-speed spool to provide mechanical power to the aircraft accessory via the accessory gearbox.

In another example, another system for providing mechanical power to an aircraft accessory with a turbine engine is described. The turbine engine includes a low-speed spool and a high-speed spool. The system comprises an accessory gearbox disposed between the low-speed spool and the high-speed spool, and the accessory gearbox configured to drive the aircraft accessory. The system also comprises a clutch disposed external to the accessory gearbox, the clutch configured to enable either the high-speed spool or the low-speed spool to provide mechanical power to the aircraft accessory via the accessory gearbox.

In another example, a method for providing mechanical power to an aircraft accessory with a turbine engine is described. The turbine engine includes a low-speed spool and a high-speed spool and an accessory gearbox disposed between the low-speed spool and the high-speed spool that is configured to drive the aircraft accessory. The method comprises enabling, via a clutch of the accessory gearbox, either the high-speed spool or the low-speed spool to provide mechanical power to the aircraft accessory via the accessory gearbox.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings.

FIG. 4 is a block diagram illustrating a detailed example of the system, according to an example implementation.

FIG. 5 is a block diagram illustrating another detailed example of the system, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, a system and method for driving components installed on an accessory gearbox using either a low-speed spool or a high-speed spool is described. In an example, the systems and methods described herein utilize a clutch and a transmission, such as for example, a continuously variable speed transmission (CVT), to allow the aircraft accessories to be driven either by the low-speed (low-pressure) spool or the high-speed (high-pressure) spool. The low-speed spool drive is advantageous at low engine power, such as idle, and during engine accelerations. The high-speed spool drive is advantageous at steady conditions, such as cruise.

Further, in instances of engine thrust production below a threshold, the low-speed spool can still provide power to the engine accessories by extracting power from a windmilling fan. In an example of a failure of the CVT, the high-speed spool can drive the aircraft accessories. Thus, the examples described herein may enable improvements in fuel efficiency of the engine, reduce idle thrust, and improve availability of aircraft accessories to perform their intended functions.

Figure 1:
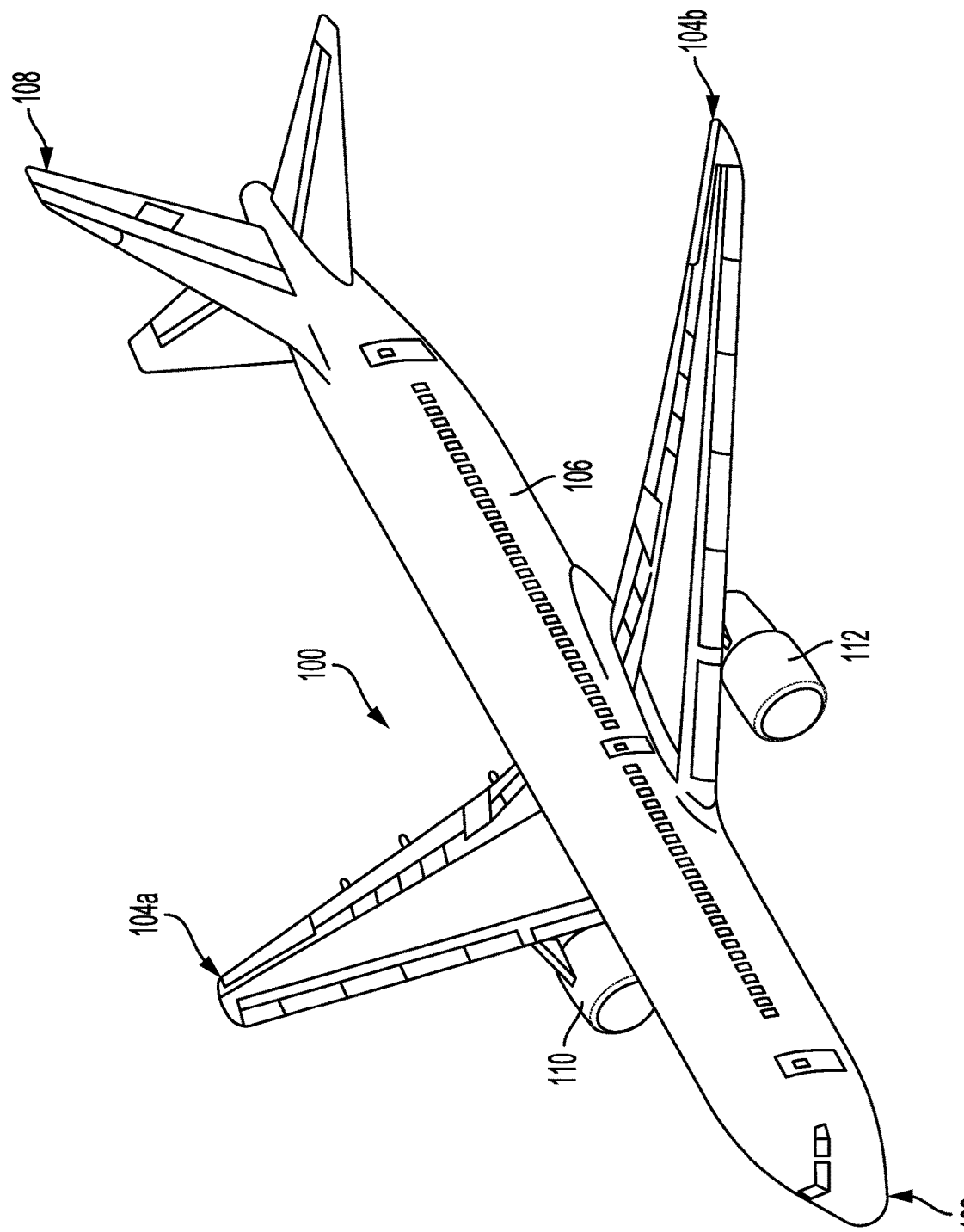
FIG. 1 is a perspective view of an aircraft, according to an example implementation.

Referring now to the figures, FIG. 1 is a perspective view of an aircraft 100, according to an example implementation. The aircraft 100 includes a nose 102, wings 104a-b, a fuselage 106, and a tail 108, according to an example implementation. The aircraft 100 also includes a first engine 110 and a second engine 112 on the wings 104a-b, respectively. Each of the first engine 110 and the second engine 112 is a turbine engine in one example.

Figure 2:
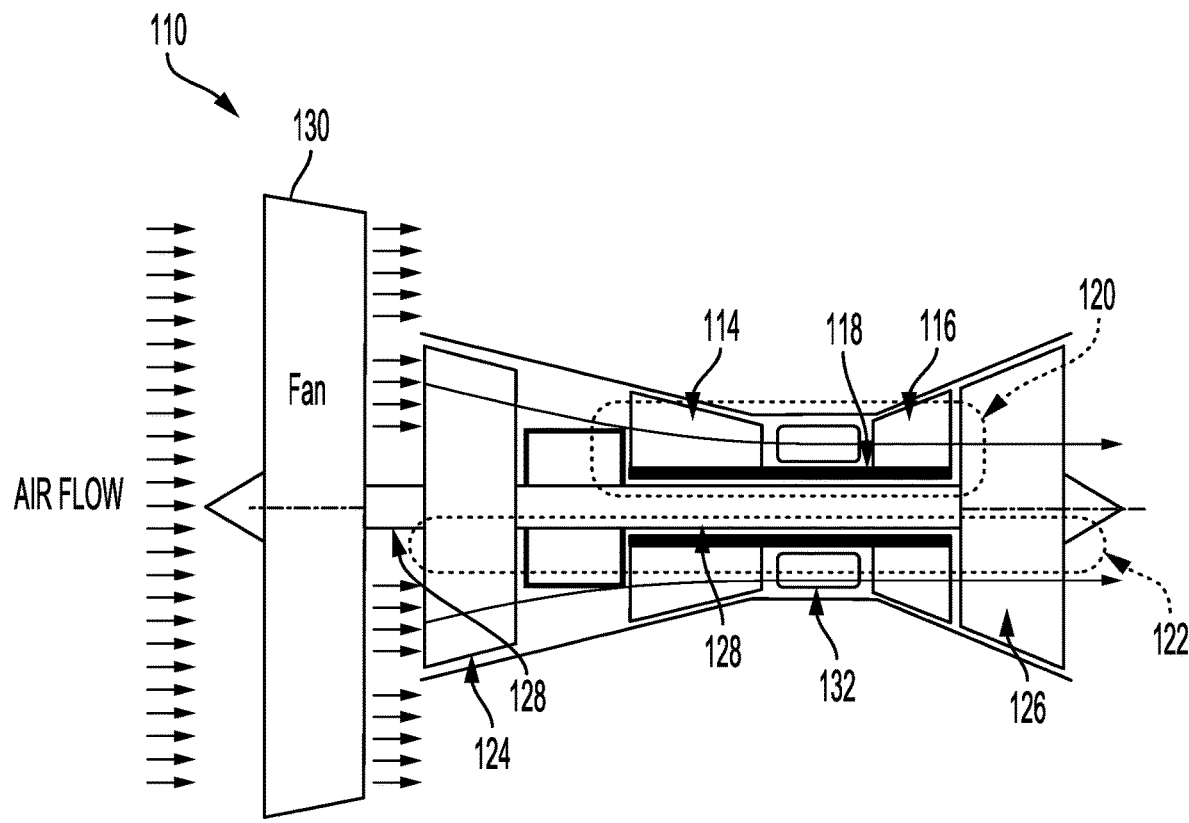
FIG. 2 is a cross-sectional, schematic view of an example turbine engine, according to an example implementation.

FIG. 2 is a cross-sectional, schematic view of an example turbine engine, such as the first turbine engine 110, according to an example implementation. The first turbine engine 110 includes a high pressure compressor 114 that is coupled to a high pressure turbine 116 via a first shaft 118. The high pressure compressor 114, the high pressure turbine 116, and the first shaft 118 together form a high-speed spool 120 of the first turbine engine 110. The first turbine engine 110 further includes a low-speed spool 122. The low-speed spool 122 includes a low pressure compressor 124, a low pressure turbine 126, and an associated second shaft 128 coupled between the low pressure compressor 124 and the low pressure turbine 126. The first turbine engine 110 further includes a fan 130 that is coupled to the low-speed spool 122 via the second shaft 128. The second shaft 128 is positioned annularly inwardly from the first shaft 118 so that the low-speed spool 122 and the high-speed spool 120 can rotate at different speeds (e.g., the low-speed spool 122 and the high speed spool 120 are concentric). In operation, the high pressure compressor 114 compresses incoming air, which is then provided to a combustor 132. Fuel is injected into the combustor 132 wherein the fuel is mixed with the compressed air and ignited. Resultant hot exhaust products are expanded through the high pressure turbine 116 to drive the high pressure compressor 114. The exhaust gases are further expanded through the low pressure turbine 126 to drive both the low pressure compressor 124 and the fan 130. Thus, the first turbine engine 110 is arranged in a serial flow configuration in which a portion of the fan 130, the low pressure compressor 124, and the high pressure compressor 114 compress a portion of airflow entering the first turbine engine 110, the combustor 132 burns a mixture of fuel and air, and the low pressure turbine 126 and the high pressure turbine 116 extract power from airflow discharged from the combustor 132 to generate thrust.

The high-speed spool 120 operates at a higher pressure than the low-speed spool 122. In some examples, the high-speed spool 120 is referred to as a high pressure spool, and the low-speed spool 122 is referred to as a low pressure spool.

The first turbine engine 110 propels the aircraft 100, along with the second turbine engine 112, and each can be operated to generate electrical, hydraulic, and pneumatic power for components of the aircraft 100. It should be realized, that the second turbine engine 112 is substantially the same as the first turbine engine 110 and therefore includes the same components and operates in the same manner as described above.

Figure 3:
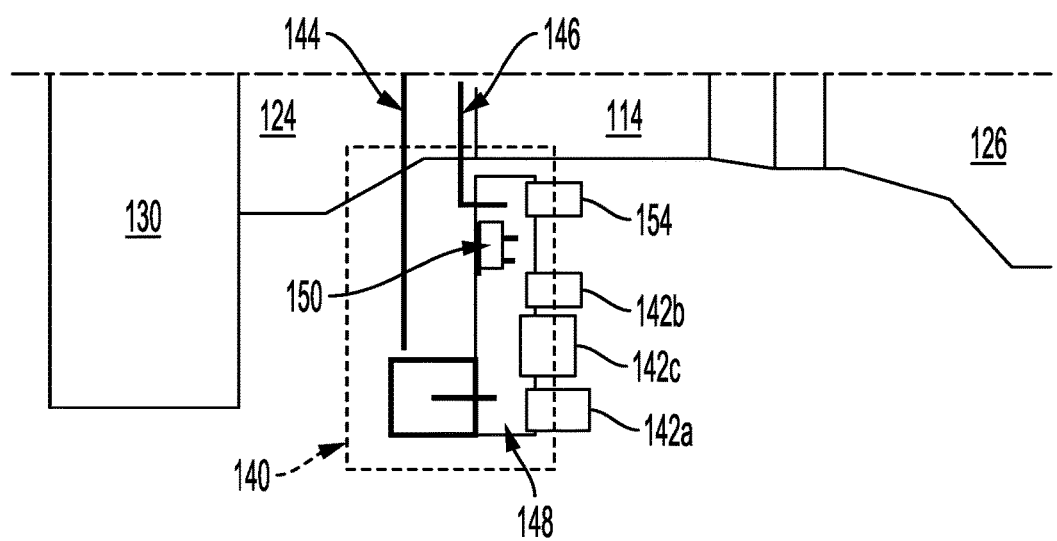
FIG. 3 is a cross-sectional, partial schematic view of the turbine engine with a system for providing mechanical power to an aircraft accessory with the turbine engine, according to an example implementation.

FIG. 3 is a cross-sectional, partial schematic view of the turbine engine 110 with a system 140 for providing mechanical power to an aircraft accessory 142a-c with the turbine engine 110, according to an example implementation. The turbine engine 110 includes the low-speed spool 122 and the high-speed spool 120 as described above in FIG. 2. In FIG. 3, a low-speed spool drive shaft 144 and a high-speed spool drive shaft 146 are shown. The system 140 includes an accessory gearbox 148 disposed between the low-speed spool 122 and the high-speed spool 120, and the accessory gearbox 148 is configured to drive the aircraft accessory 142a-c. The system 140 also includes a clutch 150 disposed within the accessory gearbox 148, and the clutch 150 is configured to enable either the high-speed spool 120 or the low-speed spool 122 to provide mechanical power to the aircraft accessory 142a-b via the accessory gearbox 148.

The accessory gearbox 148 also couples to one or more engine accessories 154. The engine accessories 154 include a starter, fuel pump, lubricator pump, and other similar components.

The system 140 is shown to include multiple aircraft accessories. In some examples, the system 140 provides power to only one aircraft accessory. In other examples, the system 140 provides power to multiple aircraft accessories simultaneously.

The aircraft accessory 142a-c includes hydraulic pumps, electrical generators, air compressors, etc.

FIG. 4 is a block diagram illustrating a detailed example of the system 140, according to an example implementation. In the example of the system 140 for providing mechanical power to the aircraft accessory 142a-c with the turbine engine 110 shown in FIG. 4, the accessory gearbox 148 is shown coupled to the aircraft accessories 142a-c and engine accessories 154, 156, and 158. The accessory gearbox 148 further includes a first gear train 160 and a second gear train 162, and the first gear train 160 is coupled to a first shaft 164 of the clutch 150 and the first gear train 160 is driven by the high-speed spool drive shaft 146. The second gear train 162 is coupled to a second shaft 166 of the clutch 150 and the second gear train 162 is driven by the low-speed spool drive shaft 144.

FIG. 5 is a block diagram illustrating another detailed example of the system 140, according to an example implementation. In the example of the system 140 for providing mechanical power to the aircraft accessory 142a-c with the turbine engine 110 shown in FIG. 5, the accessory gearbox 148 is disposed between the low-speed spool 122 and the high-speed spool 120 and the accessory gearbox 148 is configured to drive the aircraft accessory 142a-c, and the clutch 150 is disposed external to the accessory gearbox 148. Like the example shown in FIG. 4, the clutch 150 is configured to enable either the high-speed spool 120 or the low-speed spool 122 to provide mechanical power to the aircraft accessory 142a-c via the accessory gearbox 148.

However, in FIG. 5, the clutch 150 is external to the accessory gearbox 148, and thus, the clutch 150 can be removed and replaced more easily. In the example shown in FIG. 5, the clutch is a stand-alone unit that is attached to the accessory gearbox 148 (e.g., with bolts). The external arrangement of the clutch 150 thus enables easier maintenance to be performed on the clutch 150.

In an example operation, the clutch 150 enables the low-speed spool 122 (via the low-speed spool drive shaft 144) to provide mechanical power to the aircraft accessory 142a-c based on a rotational speed of the second shaft 166 of the clutch 150 being higher than a rotational speed of the first shaft 164 of the clutch 150. The clutch 150 in this example is a friction clutch 150.

Similarly, in another example operation, based on a rotational speed of the first shaft 164 of the clutch 150 being higher than a rotational speed of the second shaft 166 of the clutch 150, the clutch 150 locks to the first shaft 164 to enable the high-speed spool 120 to provide mechanical power to the aircraft accessory 142a-c.

In the examples shown in FIGS. 4-5, the first shaft 164 of the clutch 150 is also coupled to a plurality of the engine accessories 154, 156, and 158. The plurality of the engine accessories 154, 156, and 158 always receive mechanical power from the high-speed spool 120, for example.

Figure 8:
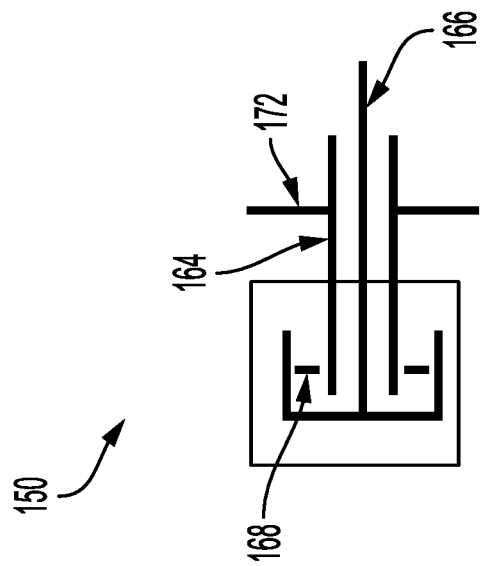
FIG. 8 illustrates another example of the clutch, according to an example implementation.
Figure 7:
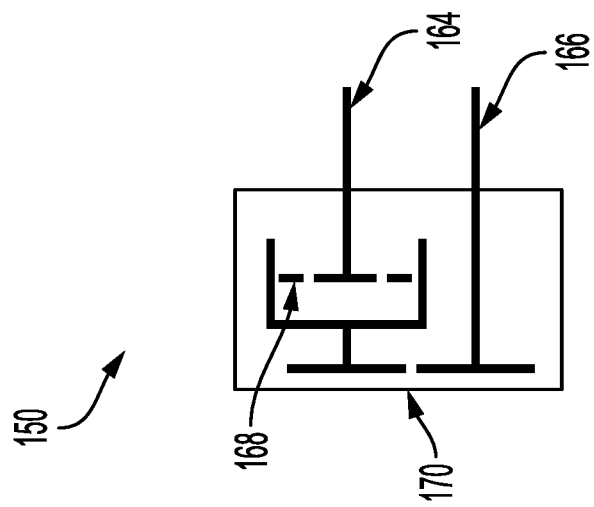
FIG. 7 illustrates another example of the clutch, according to an example implementation.
Figure 6:
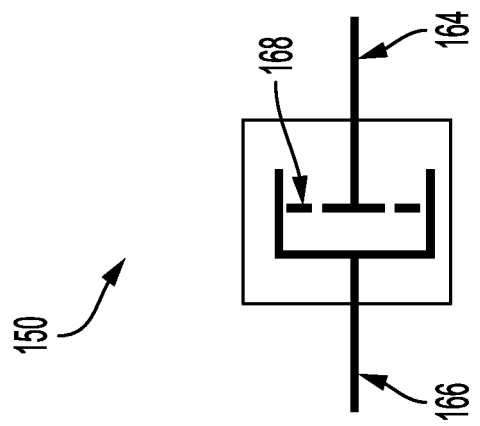
FIG. 6 illustrates an example of the clutch, according to an example implementation.

FIGS. 6-8 illustrate an example of the clutch 150 in different arrangements, according to example implementations. The clutch 150 shown in FIGS. 6-8 is an overunning clutch in some examples.

In FIG. 6, the clutch 150 includes the first shaft 164 coupled to the second shaft 166 via sprag elements 168. The sprag elements 168 lock onto the first shaft 164 when a rotational speed of the first shaft 164 is higher than a rotational speed of the second shaft 166. The sprag elements 168 slide free from the first shaft 164 when the first shaft 164 rotates with a lower relative speed as compared to the second shaft 166.

In FIG. 7, the clutch 150 is arranged with the first shaft 164 and the second shaft 166 positioned side by side and coupled through a gear train 170. The first shaft 164 operates as an input shaft and the second shaft 166 operates as an output shaft.

In FIG. 8, the clutch 150 is arranged such that the first shaft 164 of the clutch 150 and the second shaft 166 of the clutch 150 are concentric. The first shaft 164 surrounds the second shaft 166. The first shaft 164 includes a gear wheel 172 to drive the first shaft 164. Similar to the arrangements in FIGS. 6-7, the sprag elements 168 lock onto the first shaft 164 in the same manner based on relative rotational speeds of the first shaft 164 and the second shaft 166.

In some examples, in the arrangements shown in FIGS. 6-8, the sprag elements 168 are replaced by one or more friction plates and an actuator is included to control a position of the frictions plates so that the clutch 150 takes the form of a friction clutch.

Figure 9:
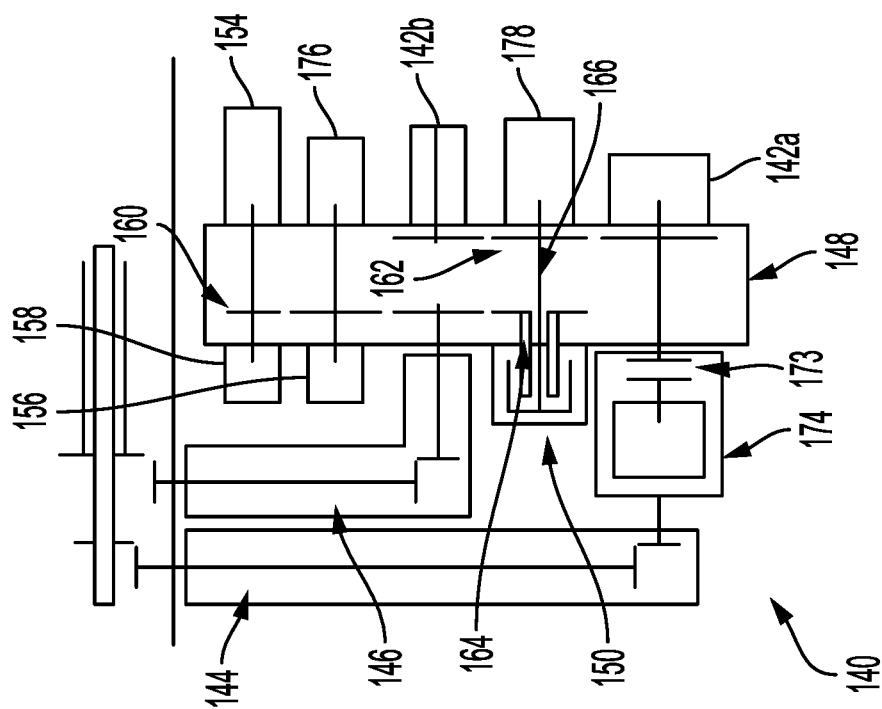
FIG. 9 is a block diagram illustrating another detailed example of the system, according to an example implementation.

FIG. 9 is a block diagram illustrating another detailed example of the system 140, according to an example implementation. In FIG. 9, all similar components previously described with respect to FIG. 5 remain the same, and the clutch 150 is an external component of the accessory gear box 148. In addition, in FIG. 9, the clutch 150 is a first clutch, and the system 140 further includes a second clutch 174 coupled between the low-speed spool drive shaft 144 and the second gear train 162 of the accessory gear box 148. The second clutch 174 is external to the accessory gearbox 148 and can be a friction-type clutch, for example. The system 140 in FIG. 9 also includes an additional engine accessory 176 coupled to the first gear train 160, and an electrical motor 178 coupled to the clutch 150 via the second gear train 162. Note that the electrical motor power source 178 could have two modes: as an electrical generator as well as an electrical motor.

In FIG. 9, the first shaft 164 of the clutch is connected, via the first gear train 160, to the high-speed spool drive shaft 146 and to all of the engine accessories 154, 156, 158, and 176. The second shaft 166 of the clutch 150 is connected, via the second gear train 162, to the aircraft accessories 142a-b and to the second clutch 174. The second clutch 174, in turn, is connected to the low-speed spool drive shaft 144.

Figure 10:
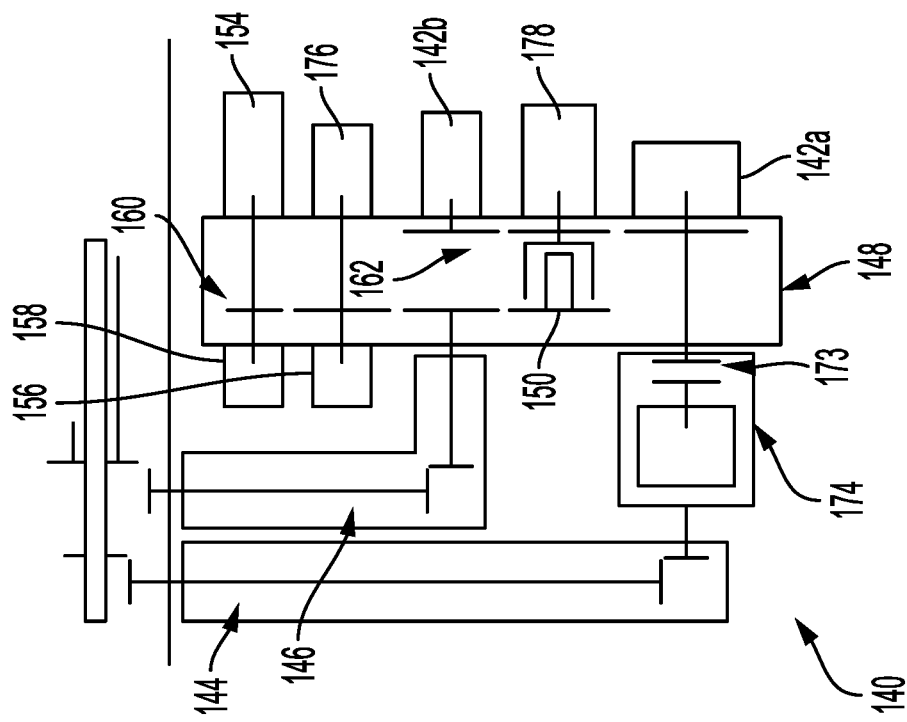
FIG. 10 is a block diagram illustrating another detailed example of the system, according to an example implementation.

FIG. 10 is a block diagram illustrating another detailed example of the system 140, according to an example implementation. In FIG. 10, all similar components previously described with respect to FIG. 4 and FIG. 9 remain the same. The arrangement shown in FIG. 10 is thus the same as in FIG. 9, with the clutch 150 being internal to the accessory gearbox 148 as in FIG. 4.

In an example operation of the systems 140 shown in FIGS. 9-10, when it is desired to operate the aircraft accessories 142a-b and 178 from the low-speed spool 122, an output speed of the clutch 150 to the accessory gearbox 148 is set by the power transfer unit 173 to a speed higher than a speed that would occur from the high-speed spool drive shaft 146. This causes the clutch 150 to overrun, unloading the high-speed spool drive shaft 146 and causing the low-speed spool 122 to provide power via the low-speed spool drive shaft 144 to the aircraft accessories 142a-b. This, in this another example operation, based on the second clutch 174 being closed, the first clutch 150 overruns the high-speed spool drive shaft 146 to enable the low-speed spool 122 to provide mechanical power to the aircraft accessory 142*a-b*.

Alternatively, when it is desired to operate the aircraft accessories 142*a-b* from the high-speed spool 120, e.g. during cruise of the aircraft 100, the following sequence of events causes power to the aircraft accessories 142*a-b* and 178 to switch from the low-speed spool drive shaft 144 to the high-speed spool drive shaft 146: 1) the output speed from the power transfer unit 173 is set to a value slightly above that which would cause the clutch 150 to lock to the first shaft 164 2) the clutch 174 is then disengaged from the first gear train 160 of the accessory gearbox 148, 3) a rotation speed driving the aircraft accessories 142*a-b* decreases, 4) when the rotation speed decreases to a speed such that the speed of the second shaft 166 equals or falls below the speed of the first shaft 164, the clutch 150 locks up, and 5) with the clutch 150 locked, the aircraft accessories 142*a-b* are driven by the high-speed spool 120.

Thus, in an example operation of the systems 140 shown in FIGS. 9-10, based on the second clutch 174 being open, the first clutch 150 locks to the high-speed spool drive shaft 146 to enable the high-speed spool 120 to provide mechanical power to the aircraft accessory 142*a-b* and 178. In other instances, based on (the need or desire for) the high-speed spool 120 providing mechanical power to the aircraft accessory 142*a-b*, the second clutch 174 is opened (e.g., the second clutch 174 is programmatically opened or triggered to be opened when the high-speed spool 120 provides mechanical power to the aircraft accessory 142*a-b*).

In addition, the system 140 further operates such that based on failure of the power transfer unit 173, the first clutch 150 locks to the high-speed spool drive shaft 146 to enable the high-speed spool 120 to provide mechanical power to the aircraft accessory 142*a-b* and 178.

In another example operation of the system 140 in FIGS. 9-10, the electrical motor power source 178 provides mechanical power to the aircraft accessory 142*a-b* via the accessory gearbox 148. This can be beneficial, for example, in an instance in which a fan speed of the fan 130 is too low, and thus, an alternate power source based on electrical power is provided.

FIGS. 11-14 illustrate examples of different modes for operating the system 140, shown in the configuration illustrated in FIG. 9, for driving the aircraft accessories 142*a-b* and 178 from either the high-speed spool 120 or the low-speed spool 122, according to example implementations. Note that the same operation results for the system 140 shown in the configuration illustrated in FIG. 10, for example.

Figure 11:
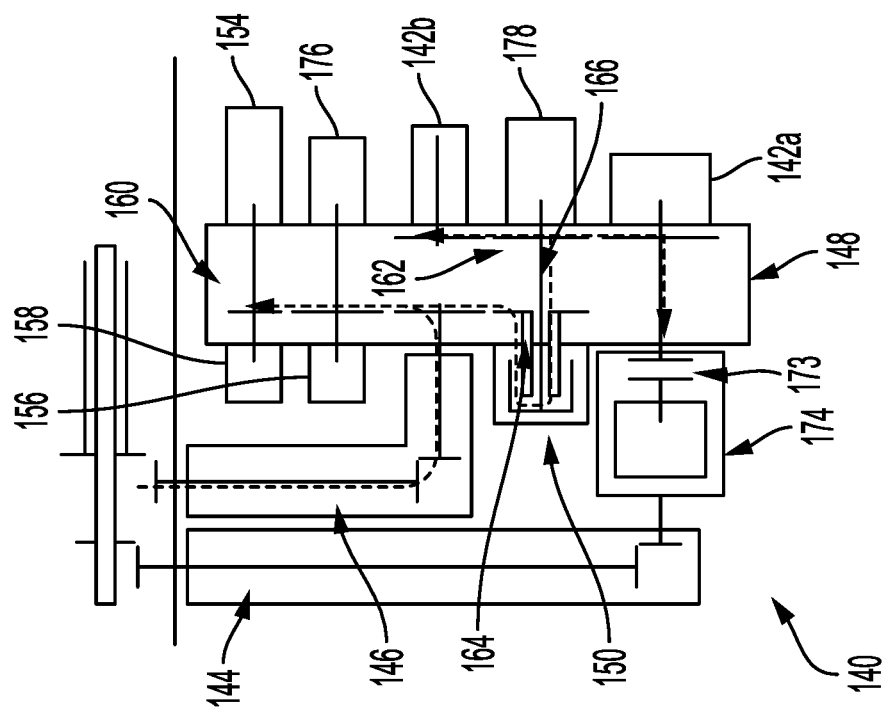
FIG. 11 illustrates an example of a mode for operating the system for driving the aircraft accessories from either the high-speed spool or the low-speed spool, according to an example implementation.

In FIG. 11, operation of the system 140 is shown where the high-speed spool 120 provides power to the aircraft accessories 142*a-b* and 178 (e.g., as shown via arrows). In this example, the second clutch 174 is open, the first clutch 150 locks to the high-speed spool drive shaft 146, and the high speed spool drives the aircraft accessories 142*a-b* and 178 via the first gear train 160 and the second gear train 162 of the accessory gearbox 148.

Figure 12:
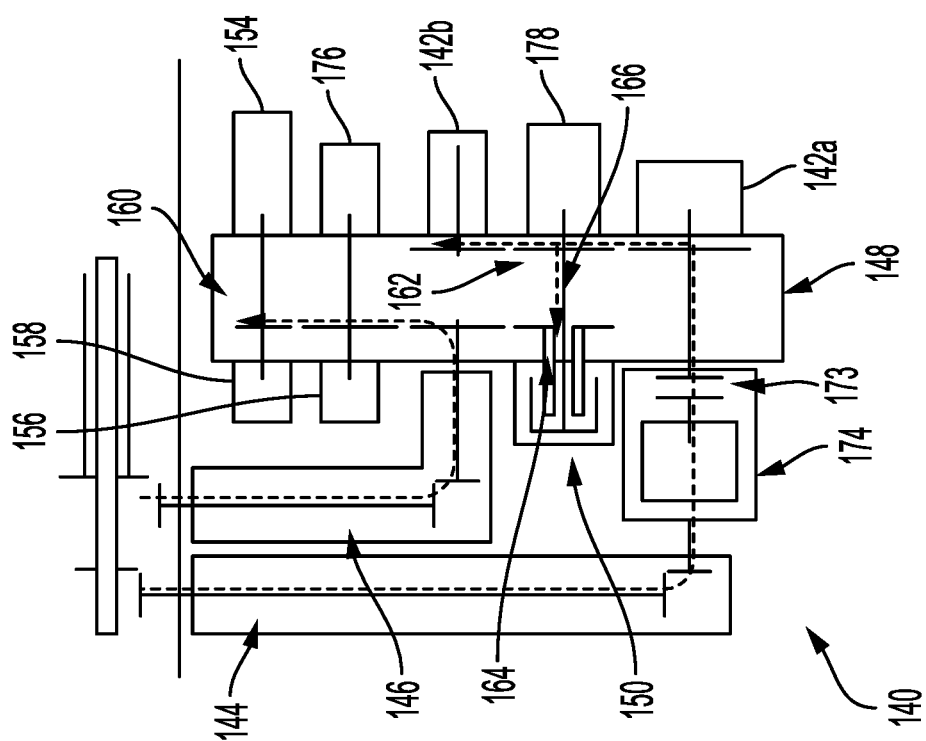
FIG. 12 illustrates an example of a mode for operating the system for driving the aircraft accessories from either the high-speed spool or the low-speed spool, according to an example implementation.

In FIG. 12, the system 140 is shown where the low-speed spool 122 provides power to the aircraft accessories 142*a-b* and 178 while the engine is running (e.g., as shown via arrows). In this example, the second clutch 174 is closed and the power transfer unit 173 is controlled to cause a sufficiently high output speed to the accessory gearbox 148 to overrun the first clutch 150 (e.g., i.e., causing the second shaft 166 to rotate faster than the first shaft 164), and the low-speed spool 122 provides power to the aircraft accessories 142*a-b* and 178. In FIG. 12, the high-speed spool 120 still provides power to the engine accessories 154, 156, 158, and 176 via the first gear train 160 of the accessory gearbox 148.

Figure 13:
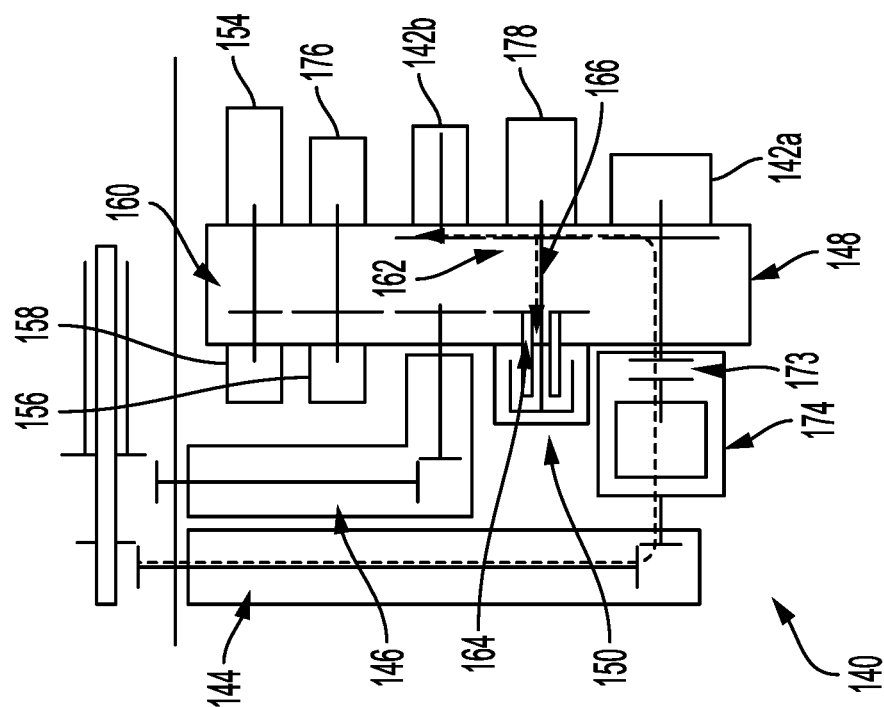
FIG. 13 illustrates an example of a mode for operating the system for driving the aircraft accessories from either the high-speed spool or the low-speed spool, according to an example implementation.

In FIG. 13, the system 140 is shown where the low-speed spool 122 provides power to the aircraft accessories 142*a-b* and 178, while the engine is inoperative but while the low-speed spool 122 is caused to rotate by a forward speed of the aircraft 100 (e.g., as shown via arrows). This rotation of the low-speed spool 122 is referred to as "windmilling" of the fan 130. In this example, for engine out conditions, the core turns slowly, however, the fan is windmilling. Thus, power from the low-speed spool 122 is still available.

Figure 14:
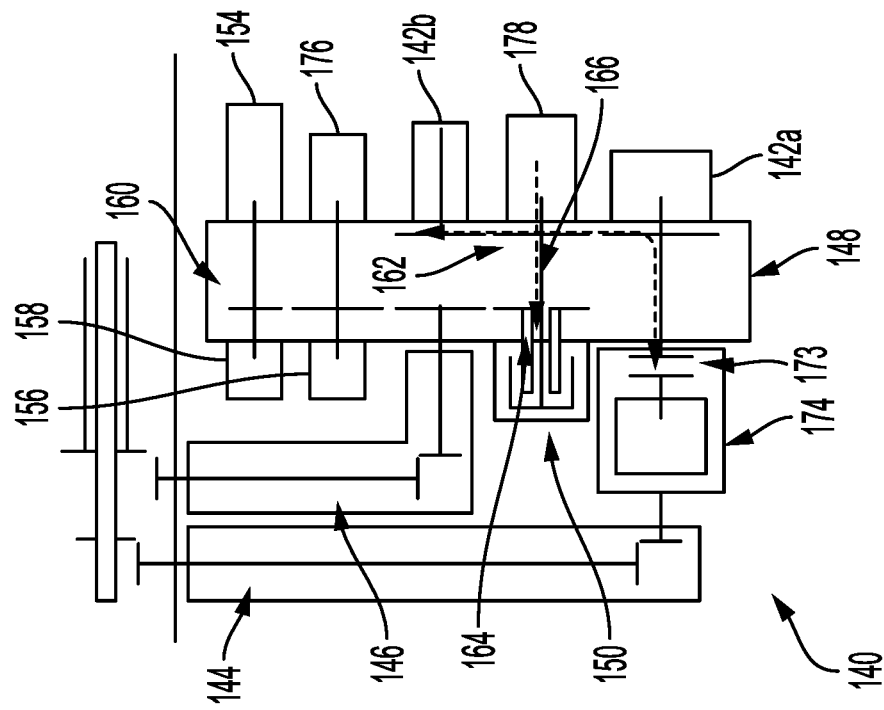
FIG. 14 illustrates an example of a mode for operating the system for driving the aircraft accessories from either the high-speed spool or the low-speed spool, according to an example implementation.

In FIG. 14, the system 140 is shown where a source of electric power causes the electrical motor power source 178 to operate as a motor and the power output of the motor provides mechanical power to other aircraft accessories 142*a-b* (e.g., as shown via arrows). This example operation may be beneficial in instances during which the engine is starting to unload the aircraft accessories 142*a-b* from the engine to improve start times. In addition, this example operation may be desirable during a single engine taxi in order to power the hydraulic pump on the non-operating engine from the electrical motor power source 178. With the second clutch 174 open, the electrical motor power source 178 can drive the other aircraft accessories 142*a-b*.

Tables 1 and 2 below show example methods of aligning the system 140 shown in FIGS. 9-10 during different phases of flight and for different failure modes for operation of the system 140 in any of the modes as described with reference to FIGS. 11-14.

Table 1 refers to operation of the system 140 where the use of the high-speed spool as a power source occurs just when there is a failure in the system for supplying power via the low-speed spool, such as for a failure of the power transfer unit 173 (PTU).

TABLE 1

| Flight Phase | Second Clutch 174 Mode Position | First Clutch 150 Operating Mode | Power Source for Aircraft Accessories |
|---|---|---|---|
| Dual Engine Taxi | 2 Closed | Over-running | Low spool |
| Takeoff | 2 Closed | Over-running | Low spool |
| Climb | 2 Closed | Over-running | Low spool |
| Cruise | 2 Closed | Over-running | Low spool |
| Descent | 2 Closed | Over-running | Low spool |

TABLE 1-continued

| Flight Phase | Second Clutch 174 Mode Position | | First Clutch 150 Operating Mode | Power Source for Aircraft Accessories |
|---|---|---|---|---|
| Engine-out diversion, operating engine | 2 | Closed | Over-running | Low spool |
| Engine-out diversion, inoperative engine, aircraft speed above limit for windmilling power offtake | 3 | Closed | Over-running | Low spool |
| Engine-out diversion, inoperative engine, aircraft speed below limit for windmilling power offtake | 4 | Open | Over-running | Aircraft electrical system |
| Single Engine Taxi, Operating Engine | 2 | Closed | Over-running | Low spool |
| Single Engine Taxi, Inoperative Engine | 4 | Open | Over-running | Aircraft electrical system |
| PTU Failed, engine operating | 1 | Open | Locked | High spool |
| PTU Failed, engine inoperative | 4 | Open | Over-running | Aircraft electrical system |

Table 2 refers to operation of the system 140, where the use of the high-speed spool as a power source occurs during high engine thrust conditions as well as when there is a failure in the system for supplying power via the low-speed spool, such as for a failure of the power transfer unit 173.

TABLE 2

| Flight Phase | Second Clutch 174 Mode Position | | First Clutch 150 Operating Mode | Power Source for Aircraft Accessories |
|---|---|---|---|---|
| Dual Engine Taxi | 2 | Closed | Over-running | Low spool |
| Takeoff | 1 | Open | Locked | High spool |
| Climb | 1 | Open | Locked | High spool |
| Cruise | 1 | Open | Locked | High spool |
| Descent | 2 | Closed | Over-running | Low spool |
| Engine-out diversion, operating engine | 1 | Open | Locked | High spool |
| Engine-out diversion, inoperative engine, aircraft speed above limit for windmilling power offtake | 3 | Closed | Over-running | Low spool |
| Engine-out diversion, inoperative engine, aircraft speed below limit for windmilling power offtake | 4 | Open | Over-running | Aircraft electrical system |
| Single Engine Taxi, Operating Engine | 2 | Closed | Over-running | Low spool |
| Single Engine Taxi, Inoperative Engine | 4 | Open | Over-running | Aircraft electrical system |
| PTU Failed, engine operating | 1 | Open | Locked | High spool |
| PTU Failed, engine inoperative | 4 | Open | Over-running | Aircraft electrical system |

The system 140 provides many advantages for providing alternate or redundant sources of power to the aircraft accessories 142*a-b* and 178 including (i) a design consideration for the high pressure compressor 114 of the turbine engine does not have to account for a large power extraction from the aircraft accessories, especially at low engine thrust conditions, (ii) if a power transfer fails, the engine accessories 154, 156, 158, and 176 are still driven by the high-speed spool 120, (iii) the second clutch 174 can be opened at cruise to avoid heat rejection losses and reduce operating time on the device (in this mode, the system 140 is powered by the high-speed spool 120), (iv) the electrical motor power source 178 can be used to add power to the low-speed spool 122 when the engine is not operating, (v) during engine-out windmilling operation, the low-speed spool 122 can power the aircraft accessories 142*a-b* and 178 reducing consequences of the engine in-operative condition and perhaps eliminating a need for a ram air turbine, and (vi) when the engine is not operating, the electrical motor power source 178 can be operated as an electric motor to provide power to either the hydraulic pump and the ECS compressor or to both of them and other aircraft accessories.

Figure 15:
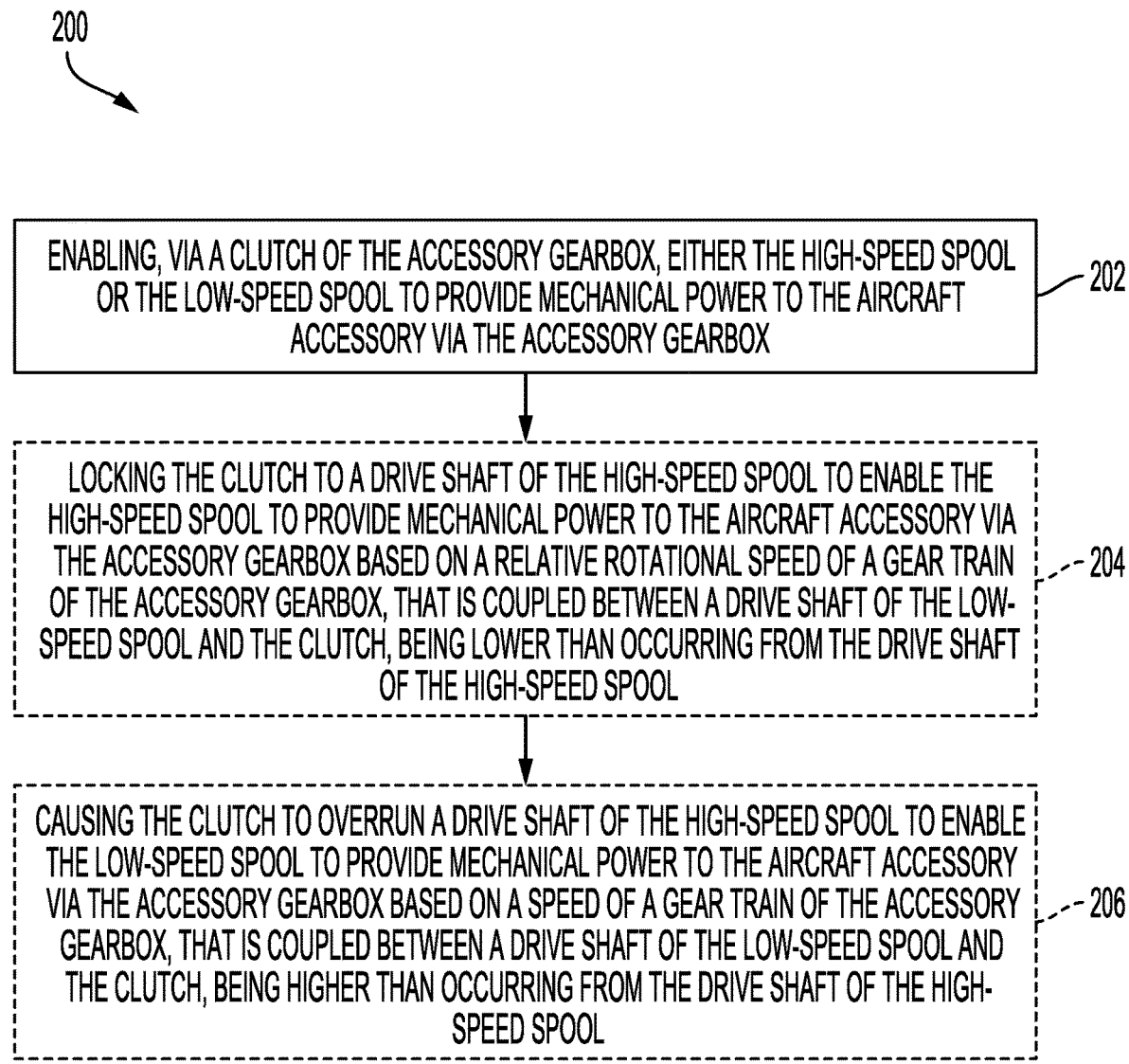
FIG. 15 is a flowchart illustrating an example of a method for providing mechanical power to an aircraft accessory with a turbine engine, according to an example implementation.

FIG. 15 is a flowchart illustrating an example of a method 200 for providing mechanical power to an aircraft accessory with a turbine engine, according to an example implementation. Method 200 shown in FIG. 15 presents an example of a method that could be used with the aircraft 100 shown in FIG. 1 or with the system 140 shown throughout the Figures, for example. Further, devices or systems may be used or configured to perform logical functions presented in FIG. 15. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

The method 200 is performed with a turbine engine including a low-speed spool and a high-speed spool and an accessory gearbox disposed between the low-speed spool and the high-speed spool that is configured to drive the aircraft accessory. At block 202, the method 200 includes enabling, via a clutch of the accessory gearbox, either the high-speed spool or the low-speed spool to provide mechanical power to the aircraft accessory via the accessory gearbox.

In one example, at block 204, the method 200 optionally includes locking the clutch to a drive shaft of the high-speed spool to enable the high-speed spool to provide mechanical power to the aircraft accessory via the accessory gearbox based on a relative rotational speed of a gear train of the accessory gearbox, that is coupled between a drive shaft of the low-speed spool and the clutch, being lower than occurring from the drive shaft of the high-speed spool.

In another example, at block 206, the method 200 optionally includes causing the clutch to overrun a drive shaft of the high-speed spool to enable the low-speed spool to provide mechanical power to the aircraft accessory via the accessory gearbox based on a speed of a gear train of the accessory gearbox, that is coupled between a drive shaft of the low-speed spool and the clutch, being higher than occurring from the drive shaft of the high-speed spool.

In still further examples, the method 200 includes functions for implementing different modes for operation of the system 140 in any of the modes as described with reference to FIGS. 11-14.

Example methods and systems described herein enable switching between the high-speed spool 120 and the low-speed spool 122 for providing power to the aircraft accessories. Use of the high-speed spool 120 alone to power the aircraft accessories can cause use of more fuel, and switching to use of the low-speed spool 122 in certain instances enables increased fuel usage efficiency.

In addition, enabling switching between the high-speed spool 120 and the low-speed spool 122 for providing power to the aircraft accessories offers a backup power source. If the low-speed spool 122 fails, for examples, the system switches back to use of the high-speed spool 120.

Figure 16:
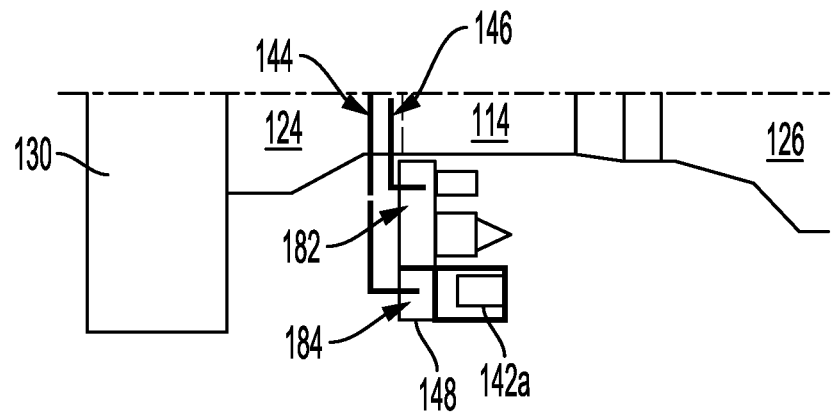
FIG. 16 illustrates an example alternate system for driving accessories from only the low-speed spool, according to example implementation.
Figure 17:
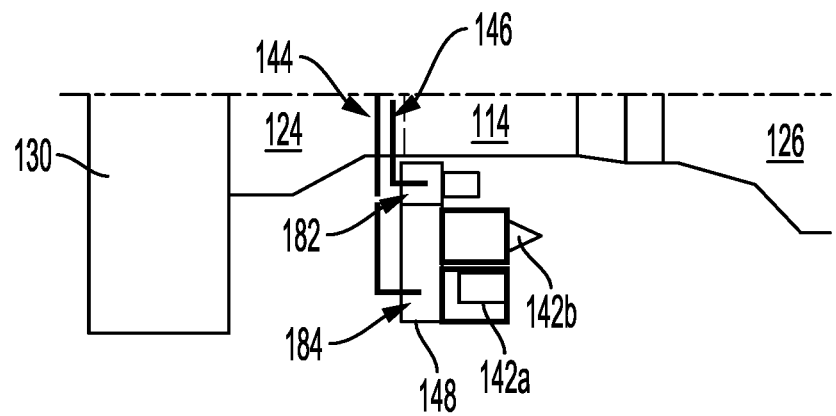
FIG. 17 illustrates another example alternate system for driving accessories from only the low-speed spool, according to example implementation.
Figure 18:
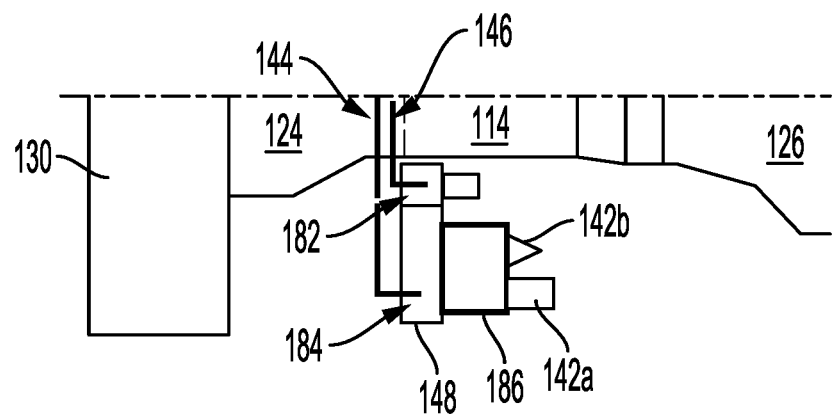
FIG. 18 illustrates another example alternate system for driving accessories from only the low-speed spool, according to example implementation.

FIGS. 16-18 illustrate alternate systems for driving accessories from only the low-speed spool 122, according to example implementations.

FIG. 16 illustrates a system for providing mechanical power to a single aircraft accessory 180. In FIG. 16, the accessory gearbox 148 is shown partitioned into a first part 182 driven by the high-speed spool 120 via a high-speed spool drive shaft 146 and a second part 184 driven by the low-speed spool 122 via a low-speed spool drive shaft 144.

In the example shown in FIG. 16, the aircraft accessory 142a is mounted to the second part 184 of the accessory gearbox 148 driven by the low-speed spool 122. The aircraft accessory 142a may include an electrical generator that is utilized to accommodate a wide speed range of the low-speed spool drive shaft 146. The speed range of the high-speed spool drive shaft 146 is approximately 2:1 (i.e., a maximum speed (in RPM) is about twice a minimum). A maximum speed occurs at takeoff thrust settings and a minimum speed occurs at idle. For the low-speed spool drive shaft 146, the speed range is approximately 5:1. The low-speed spool electrical generator is likely heavier and more costly than the high-speed spool electrical generator. For example, a continuously variable transmission may be needed.

FIG. 17 illustrates a system for providing mechanical power from the low-speed spool 122 to more than one aircraft accessory. In this example, additional aircraft accessories are mounted to the second part 184 of the accessory gearbox 148 driven by the low-speed spool 122. For example, a low-speed spool ECS compressor 142b is added to the second part 184 of the accessory gearbox 148. To accommodate a larger speed range, a heavier transmission may be utilized by the ECS compressor.

FIG. 18 illustrates another example of a system for providing mechanical power from the low-speed spool 122 to more than one aircraft accessory. In this example, a single transmission 186 drives more than one aircraft accessory. The transmission is driven by the low-speed spool 122 and accommodates the wide speed rang of the low-speed spool. In FIG. 18, both of the aircraft accessories 142a-b (e.g., the ECS compressor and the electrical generator) are driven by a single transmission. In this example, the system offers reduced weight and cost as compared to having two separate transmissions. However, a failure of the single transmission 186 causes loss of function for both aircraft accessories 142a-b.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system for providing mechanical power to an aircraft accessory with a turbine engine, wherein the turbine engine includes a low-speed spool and a high-speed spool, the system comprising:
    an accessory gearbox disposed between the low-speed spool and the high-speed spool, the accessory gearbox configured to drive the aircraft accessory; and
    a clutch disposed within the accessory gearbox, the clutch configured to enable either the high-speed spool or the low-speed spool to provide mechanical power to the aircraft accessory via the accessory gearbox,
    wherein the accessory gearbox further includes a first gear train and a second gear train, wherein the first gear train is coupled to a first shaft of the clutch and the first gear train is driven by a high-speed spool drive shaft, and wherein the second gear train is coupled to a second shaft of the clutch and the second gear train is driven by a low-speed spool drive shaft.

2. The system of claim 1, wherein the clutch is a friction clutch.

3. The system of claim 1, wherein the first shaft of the clutch and the second shaft of the clutch are concentric.

4. The system of claim 1, wherein the first shaft of the clutch and the second shaft of the clutch are positioned side by side.

5. The system of claim 1, wherein the first shaft of the clutch is also coupled to a plurality of engine accessories.

6. The system of claim 5, wherein the plurality of engine accessories always receive mechanical power from the high-speed spool.

7. The system of claim 1, wherein the clutch enables the low-speed spool to provide mechanical power to the aircraft accessory based on a rotational speed of the second shaft of the clutch being higher than a rotational speed of the first shaft of the clutch.

8. The system of claim 1, wherein based on a rotational speed of the first shaft of the clutch being higher than a rotational speed of the second shaft of the clutch, the clutch locks to the high-speed spool drive shaft to enable the high-speed spool to provide mechanical power to the aircraft accessory.

9. The system of claim 1, wherein the clutch is a first clutch, and the system further comprises:
    a second clutch coupled between the low-speed spool drive shaft and the second gear train of the accessory gearbox.

10. The system of claim 9, wherein based on the second clutch being open, the first clutch locks to the high-speed spool drive shaft to enable the high-speed spool to provide mechanical power to the aircraft accessory.

11. The system of claim 9, wherein based on the high-speed spool providing mechanical power to the aircraft accessory, the second clutch is opened.

12. The system of claim 9, wherein based on the second clutch being closed, the first clutch overruns the high-speed spool drive shaft to enable the low-speed spool to provide mechanical power to the aircraft accessory.

13. The system of claim 9, wherein based on failure of the second clutch, the first clutch locks to the high-speed spool drive shaft to enable the high-speed spool to provide mechanical power to the aircraft accessory.

14. The system of claim 1, further comprising an electrical motor power source coupled to the clutch, wherein the electrical motor power source provides mechanical power to the aircraft accessory via the accessory gearbox.

15. A system for providing mechanical power to an aircraft accessory with a turbine engine, wherein the turbine engine includes a low-speed spool and a high-speed spool, the system comprising:
    an accessory gearbox disposed between the low-speed spool and the high-speed spool, the accessory gearbox configured to drive the aircraft accessory; and
    a clutch disposed external to the accessory gearbox, the clutch configured to enable either the high-speed spool or the low-speed spool to provide mechanical power to the aircraft accessory via the accessory gearbox,
    wherein the accessory gearbox further includes a first gear train and a second gear train, wherein the first gear train is coupled to a first shaft of the clutch and the first gear train is driven by a high-speed spool drive shaft, and wherein the second gear train is coupled to a second shaft of the clutch and the second gear train is driven by a low-speed spool drive shaft.

16. The system of claim 15, wherein the clutch is a first clutch and the system further comprises:
    a second clutch coupled between the low-speed spool drive shaft and the second gear train of the accessory gearbox.

17. The system of claim 15, wherein the first shaft of the clutch and the second shaft of the clutch are concentric.

18. A method for providing mechanical power to an aircraft accessory with a turbine engine, wherein the turbine engine includes a low-speed spool and a high-speed spool and an accessory gearbox disposed between the low-speed spool and the high-speed spool that is configured to drive the aircraft accessory, the method comprising:
    enabling, via a clutch of the accessory gearbox, either the high-speed spool or the low-speed spool to provide mechanical power to the aircraft accessory via the accessory gearbox,
    wherein the accessory gearbox further includes a first gear train and a second gear train, wherein the first gear train is coupled to a first shaft of the clutch and the first gear train is driven by a high-speed spool drive shaft, and wherein the second gear train is coupled to a second shaft of the clutch and the second gear train is driven by a low-speed spool drive shaft.

19. The method of claim 18, further comprising:
    locking the clutch to the high-speed spool drive shaft to enable the high-speed spool to provide mechanical power to the aircraft accessory via the accessory gearbox based on a relative rotational speed of the second gear train of the accessory gearbox, that is coupled between the low-speed spool drive shaft and the clutch, being lower than occurring from the high-speed spool drive shaft.

20. The method of claim 18, further comprising:
    causing the clutch to overrun the high-speed spool drive shaft to enable the low-speed spool to provide mechanical power to the aircraft accessory via the accessory gearbox based on a speed of the second gear train of the accessory gearbox, that is coupled between the low-speed spool drive shaft and the clutch, being higher than occurring from the high-speed spool drive shaft.

* * * * *